United States Patent
Llamas et al.

(10) Patent No.: US 7,272,414 B2
(45) Date of Patent: Sep. 18, 2007

(54) METHOD AND APPARATUS FOR CONFIGURING A VOICE OVER IP CLIENT CONNECTION

(75) Inventors: Luis F. Llamas, Manorville, NY (US); Jovan D. Milosavljevic, Staten Island, NY (US); Charles P. Ubriaco, Northport, NY (US); Patrick M. Brown, Holbrook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 243 days.

(21) Appl. No.: 10/741,971

(22) Filed: Dec. 19, 2003

(65) Prior Publication Data
US 2005/0136973 A1    Jun. 23, 2005

(51) Int. Cl.
    *H04M 1/00* (2006.01)
(52) U.S. Cl. .................... 455/555; 455/554.1
(58) Field of Classification Search ............ 455/555, 455/553, 556, 554.1; 379/88.22
    See application file for complete search history.

(56) References Cited

U.S. PATENT DOCUMENTS

| | | | |
|---|---|---|---|
| 5,802,471 A * | 9/1998 | Sawai et al. ............ 455/445 |
| 6,240,426 B1 * | 5/2001 | Beyda et al. ............ 707/201 |
| 6,571,108 B1 * | 5/2003 | Otsuka et al. ........... 455/433 |
| 6,636,528 B1 * | 10/2003 | Korpi et al. ............ 370/467 |
| 2004/0052343 A1 * | 3/2004 | Glaser et al. ........... 379/88.22 |
| 2005/0059402 A1 * | 3/2005 | Jagadeesan et al. ...... 455/445 |
| 2005/0147222 A1 * | 7/2005 | Mitsuo ................. 379/93.24 |
| 2005/0201542 A1 * | 9/2005 | Wengrovitz ............ 379/201.01 |

OTHER PUBLICATIONS

International PCT Search Report PCT/US2004/042693 dated Apr. 26, 2005.

* cited by examiner

*Primary Examiner*—Duc M. Nguyen
*Assistant Examiner*—Dai Phuong
(74) *Attorney, Agent, or Firm*—Ingrassia Fisher & Lorenz, P.C.

(57) ABSTRACT

A method for configuring a connection comprises receiving a request to connect a mobile device having a mobile device type to a communications network including a private branch exchange (PBX) system having a PBX type. Identification information including at least one of the mobile device type and the PBX type is provided. A PBX binding layer is selected based on the identification information. The selected PBX binding layer is provided to the mobile device for interfacing with the PBX system.

29 Claims, 6 Drawing Sheets

METHOD AND APPARATUS FOR CONFIGURING A VOICE OVER IP CLIENT CONNECTION

BACKGROUND OF THE INVENTION

1. Field of the Invention

This invention relates generally to communications systems, and, more particularly, to a method and apparatus for configuring a voice over internet protocol (VOIP) client connection.

2. Description of the Related Art

Public switched telephone networks have been used for many years for voice communication. A typical telephone converts sound waves into analog signals, which are then transmitted through the public switched telephone network (PSTN) to another telephone which converts the analog audio signals back into sound waves. In recent years, wireless and cellular telephones have been rising in popularity, due to their mobility. Users are no longer tied to a stationary telephone, but are free to carry their telephones with them.

Increasingly, users are using mobile devices for data transfer, as well as for voice communication. Portable digital devices have been developed that facilitate both data and voice communication over a network. Such voice communication is commonly referred to as voice over internet protocol (VOIP) communication. Voice data is compressed into packets and delivered to the destination in a manner that is similar to the handling of data packets.

There are various types of networks to which connectivity may be desired. For example, a mobile device may connect over a network to establish voice connections with the PSTN. However, many businesses are equipped with private branch exchange (PBX) or private automatic branch exchange (PABX) systems to handle internal communication. A PBX system allows a certain number of direct lines (e.g., connections to the PSTN) to be distributed to other telephones via the use of extensions. For example a business may install a PBX system and have 5 direct lines coming into the business. Through the PBX, the five lines may be linked to 20 telephones to the system using extension lines. Calls within the business may be transferred and lines may be linked for teleconferencing. Typically, a PBX system also allows for other features such as call forwarding, call diversion, etc. While networks such as the PSTN are heavily governed by standards to insure consistency, PBX systems have no such oversight or consistency. Each PBX manufacturer typically has its own proprietary codes for performing functions such as call forwarding, transferring, etc.

Systems implementing a wide area network (WAN) using wireless data communications techniques have been generally available for many years. Implementations exist which employ radio-frequency (RF) communication systems and frequency-modulated (FM) radio communications. Frequency-modulated communication techniques include both conventional point-to-point radio and broadcast. These systems include RAM Mobile Data Service using the Mobitex protocol; the Advanced Radio Data Information Service (ARDIS), manufactured by ARDIS Company, Lincolnshire, Ill.; and the Cellular Digital Packet Data (CDPD) service.

Wireless local area networks (WLANs) are used in a variety of business and other settings. Wireless local area networks use infrared or radio frequency communications channels to communicate between stationary, portable, or mobile computer units and stationary access points or base stations. These access points are in turn connected by a wired or wireless communication channel to a network infrastructure which connects groups of access points together to form a local area network, including, optionally, one or more host computer systems.

Wireless infrared and radio frequency (RF) protocols are known which support the logical interconnection of mobile devices having a variety of types of communication capabilities to host computers. The logical interconnections are based upon an infrastructure in which at least some of the remote terminals are capable of communicating with at least two of the access points when located within a predetermined range therefrom, each terminal unit being normally associated with and in communication with a single one of such access points. Based on the overall spatial layout, response time, and loading requirements of the network, different networking schemes and communication protocols have been designed so as to most efficiently regulate the association of the mobile unit with specific access points, and the availability of the communication channel to individual mobile units for broadcasting.

One such protocol is described in U.S. Pat. Nos. 5,029,183; 5,142,550; 5,280,498; and 5,668,803 each assigned to Symbol Technologies, Inc. and incorporated herein by reference. Another such protocol is described in U.S. Pat. No. 5,673,031. Still another protocol is set forth in the IEEE Standard 802.11 entitled "Wireless LAN Medium Access Control (MAC) and Physical Layer (PHY) Specifications" available from the IEEE Standards Department, Piscataway, N.J. (hereinafter the "IEEE 802.11 Standard"). Various iterations of the 802.11 standard (e.g., 802.11b) define protocols for different data rates and capabilities. The term 802.11 is intended to cover the entire family of such specifications. The IEEE 802.11 Standard permits either infrared or RF communications, a medium access technique similar to carrier sense multiple access/collision avoidance (CSMA/CA), a power-save mode particularly important for battery-operated mobile units, seamless roaming in a full cellular network, high throughput operation, diverse antennae systems designed to eliminate "dead spots," and an easy interface to existing network infrastructures.

The basic specifications for the communication of audio, video and multimedia that are applicable to the networks pertaining to the present invention are set forth in the International Telecommunications Union Telecommunication Standards Section (ITU-T) standards H.321-323. The H.321 recommendation relates to asynchronous transfer mode (ATM) channels, H.322 to guaranteed Quality of Service LANs, and H.323 to packet based systems. Other exemplary protocols include session initiation protocol (SIP), Megaco, multimedia gateway control protocol (MGCP), and other proprietary protocols.

In VOIP systems data packets are created from a compressed data stream of digital voice samples. The data packets are formatted for transmission over a data network. Since network latency and packet transmission delays can hamper to the intelligibility and quality of real-time phone conversations, a variety of approaches of giving priority for voice packets (or other real-time multimedia packets) over data packets in the network have been proposed, thus allowing delay-sensitive packets to supercede data packets across any network node in any traffic situation. The H.323 recommendation also provides for call establishment and control, including determining the sequencing and timing of establishing and disconnect procedures, as well as the control of the H.323 session after it is established.

To the extent the Internet Protocol or "IP" (as set forth in IETF RFC 791) is used as the network layer protocol, the recommendations of the International Multimedia Teleconferencing Consortium's Voice over IP Forum may also be applicable to such a Voice over IP (VOIP) network. In a VOIP network, the voice signal is digitized, encapsulated into IP packets, and then routed between VOIP capable devices in an IP network. These packets of voice may then be delivered in real time as voice communications, or stored as voice mail.

Communications between a local area network (LAN) and a wide area network or telephone network are generally performed by communications controller known as a gateway or proxy. In the H.323 standard, for example, a gateway generally refers to an endpoint which provides for real-time, two-way communications between H.323 terminals on an IP network and other ITU terminals, telephones on a PSTN or PBX, and terminals on other networks.

For a mobile device to communicate through a gateway to a PBX system, it must be configured with the commands that the PBX expects to receive to access its functions. One problem associated with connecting a mobile device to a PBX lies in the various PBX systems and their differing internal protocols. It is not uncommon for a single business to have more than one type of PBX system installed. Hence, a device configured to interface with a particular type of PBX will not operate properly if it is connected to a network using a different PBX protocol. This problem is compounded in a wireless environment, where it is not uncommon for a user to move locations and interface with different wireless access points or gateways in the facility depending on which access point is handling the user's calls. If a user roams from one access point to another, the mobile device may cease to operate properly as it no longer knows the proper PBX commands.

The present invention is directed to overcoming, or at least reducing the effects of, one or more of the problems set forth above.

SUMMARY OF THE INVENTION

One aspect of the present invention is seen in a method for configuring a connection. The method includes receiving a request to connect a mobile device having a mobile device type to a communications network including a private branch exchange (PBX) system having a PBX type. Identification information including at least one of the mobile device type and the PBX type is provided. A PBX binding layer is selected based on the identification information. The selected PBX binding layer is provided to the mobile device for interfacing with the PBX system.

Another aspect of the present invention is seen in a system including a first communications network. The communications network includes an interface unit and a PBX system. The interface agent is adapted to receive a request for connecting a mobile device having a mobile device type to the communications network. The private branch exchange (PBX) system has a PBX type and is connected to the interface agent. At least one of the mobile device and the interface agent is adapted to provide identification information including at least one of the mobile device type and the PBX type. The interface agent is adapted to select a PBX binding layer based on the identification information and provide the selected PBX binding layer to the mobile device for interfacing with the PBX system.

BRIEF DESCRIPTION OF THE DRAWINGS

The invention may be understood by reference to the following description taken in conjunction with the accompanying drawings, in which like reference numerals identify like elements, and in which.

Figure 1:
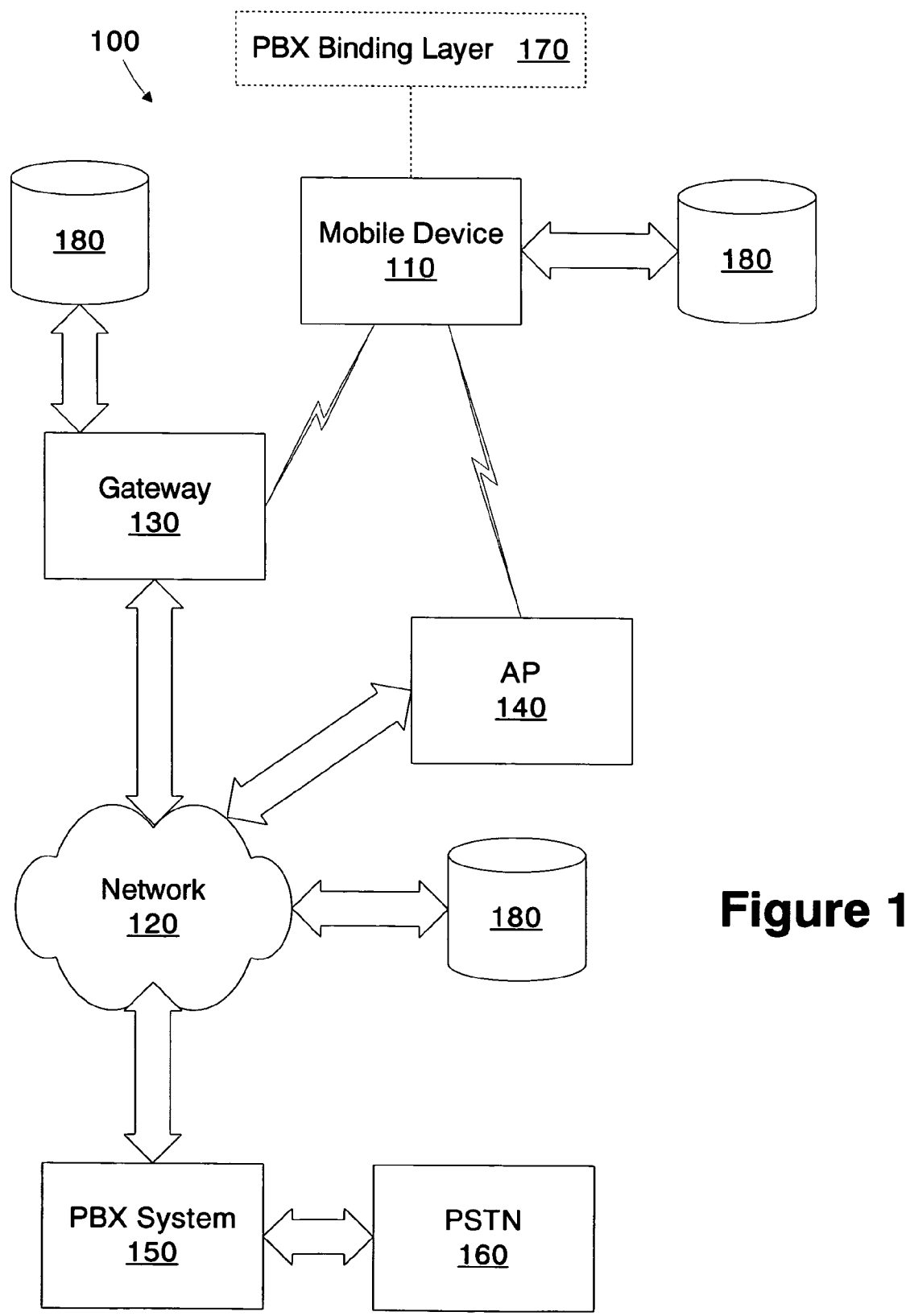
FIG. 1 is a simplified block diagram of a communications system in accordance with one exemplary embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIG. 1 shows one exemplary embodiment of a communication system 100 in accordance with one exemplary embodiment of the present invention. A mobile device 110 connects to a network 120 through a gateway 130 or an access point 140 using a wireless connection (e.g., an 802.11 type connection) or wired network connection. The term "mobile" is not intended to be limited to wireless connections. For example, the mobile device 110 may be a device that may be plugged into the network 120 at various locations within a facility. The mobile device 110 employs a voice over internet protocol (VOIP) protocol for interfacing with a private branch exchange (PBX) system 150 on the network 120. The PBX system 150 interfaces with a public switched telephone network (PSTN) 160.

Unless otherwise noted, the components of the communication system 100 are commercially available, and those of ordinary skill in the art are well versed in their construct and operation. Accordingly, these components are not described in detail herein. The communication mechanism employed in the illustrated embodiment is an open standard communication protocol, such as, but not limited to a Simple Access Object Protocol (SOAP) developed by Microsoft Corporation of Redmond, Washington and IBM Corporation of White Plains, N.Y.

To facilitate communication with the PBX system 150, the mobile device 110 employs a PBX binding layer 170 (e.g., implemented in software) that specifies the appropriate commands for interfacing with the PBX system 150 in accordance with its proprietary protocol. The PBX binding layer 170, in some embodiments, is also tailored to the particular requirements of the mobile device 110. For example, the mobile device 110 in accordance with its software (not otherwise shown) may generate a command (e.g., TR1, to implement a call transfer). The PBX system 150 may expect a different command (e.g., a TR2) to implement a call transfer in accordance with its internal protocol. The PBX binding layer 170 includes instructions that specify that an incoming TR1 command from the software of the mobile device should be converted to an outgoing TR2 command for the PBX system 150. A different type of mobile device may use a different incoming command, and a different type of PBX system may use a different outgoing command. In another embodiment, the mobile device may issue a generic transfer command, and the PBX binding layer 170 need only define the particular requirements of the particular PBX system 150 implementation.

Those of ordinary skill in the art are familiar with the commands used by the commercially available mobile devices and PBX systems, and are thus fully able to construct a PBX binding layer 170 compatible with the particular devices chosen. Accordingly, for clarity and to avoid obscuring the instant invention, further details are not provided as to this aspect of implementing the illustrated embodiment.

In various alternative embodiments, the mobile device 110 may be a VOIP telephone, a personal data assistant (PDA), a portable computer, a desktop computer, etc. Voice and/or data signals may be transmitted between the mobile device 110 and the gateway 130 and/or AP 140. In one embodiment, the voice and/or data signals may be transmitted between mobile device 110 and the gateway 130 and/or AP 140 using a modulated radio signal having a common frequency, such as a 2.4 GHz modulated carrier radio signal. Although a separate gateway 130 and AP 140 are illustrated, both need not be present in all embodiments. Also, an AP 140 may be configured to act as both a gateway and an AP. Hence, in the following examples, when the mobile device 110 is said to be connecting to the gateway 130, it is meant to include the situation where an AP 140 functions as a gateway 130. Although the following description describes communication through the gateway 130 or AP 140, the invention is not so limited, and other interface agents may be used. For example, the mobile device 110 may connect to the network 120 through interface agents, such as, but not limited to, the gateway 130, the AP 140, a wired or wireless switch (not shown), a server (not shown), etc.

When the mobile device 110 establishes a connection to the network 120 through the gateway 130, the gateway 130 first establishes the identity of the user using the mobile device 110 by an exchange of user and password information. Upon identifying the user, the gateway 130 determines if the user has access to voice functions (i.e., access to the PBX system 150) in accordance with their account. The gateway 130 then provides PBX identity information specifying the identity of the PBX system 150. The PBX identity information may specify both the identity of the PBX system 150 and its associated PBX protocol, or simply just the manufacturer and model information for the PBX system 150.

Based on the PBX identity information, the gateway 130 or the mobile device 110 accesses a library of binding layers 180 to determine the appropriate PBX binding layer 170 with which to configure the mobile device 110. Note that the "appropriate" PBX binding layer 170 will be one that converts between the commands issued by the software of the mobile device 110 and those employed by the PBX system 150. Potential locations for the library 180 and how the appropriate PBX binding layer 170 is provided to the mobile device 110 are discussed in greater detail below. Although FIG. 1 illustrates multiple libraries 180, it is not required that each of the individual libraries 180 be present in all embodiments. For example, if the gateway 130 is tasked with identifying the appropriate PBX binding layer 170, the libraries 180 on the mobile device 110 and the network 120 may be omitted.

Upon receiving the appropriate PBX binding layer 170, the mobile device 110 is configured to access the PBX system 150 and the gateway 130 specifies the particular features the user is authorized to access on the PBX system 150 based on the user's profile information. For example, different users may have different profiles that define their respective abilities to access local or long distance services over the PSTN 160, internal extensions within the PBX system 150, voice mail, call forwarding, call waiting, etc.

Figure 2A:
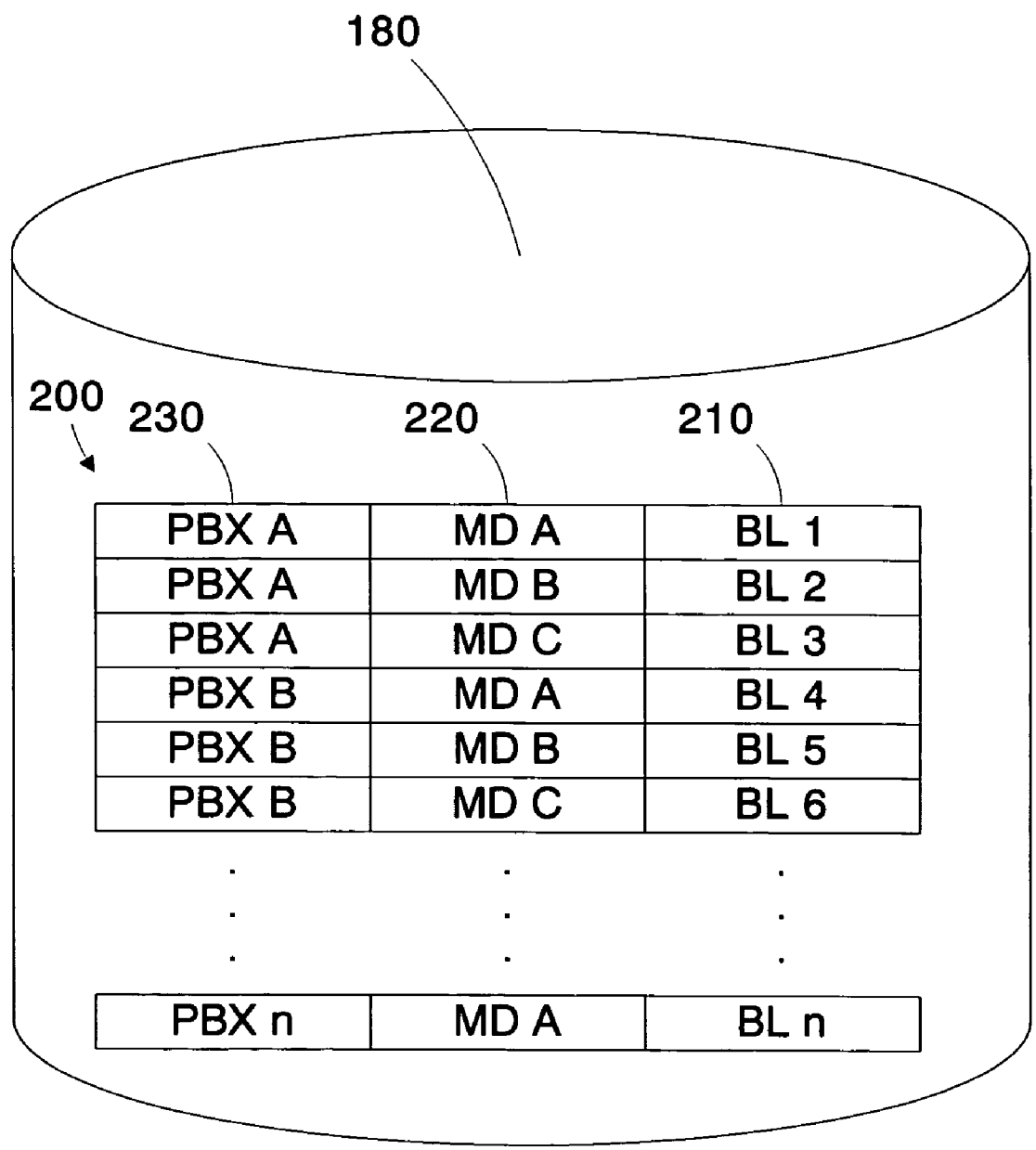
FIGS. 2A-2C illustrate exemplary entries in a library of binding layers used in the system of FIG. 1.

FIG. 2A illustrates a simplified diagram of entries 200 in the library of binding layers 180. Note that the library 180 may be implemented using any suitable data structure known to the art. In the illustrated embodiment of FIG. 2A, each entry 200 includes a binding layer 210 indexed by a mobile device type field 220 and a PBX type field 230. Upon determining the type of mobile device 110 accessing the PBX system 150 and the type of PBX system 150 being accessed, the appropriate binding layer 210 may be selected. As will be described in greater detail below, depending on the particular implementation, one of the type fields 220, 230 may be omitted.

Figure 2C:
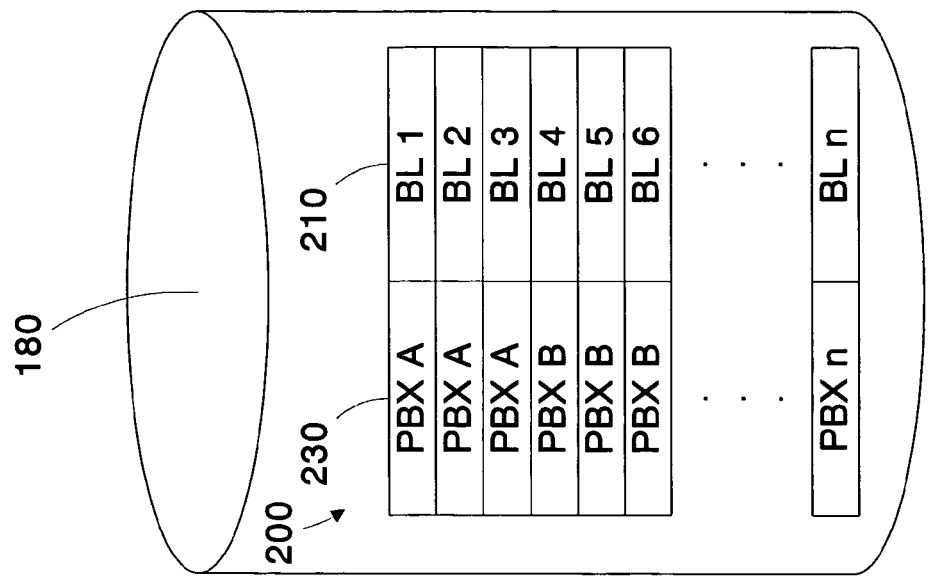
Figure 2B:
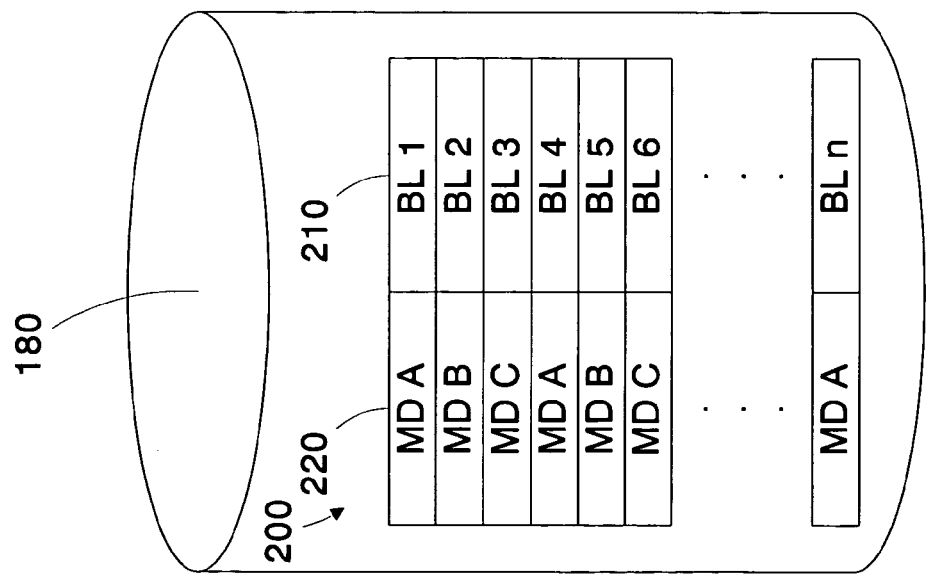

In a first illustrative embodiment, the gateway 130 is tasked with providing the mobile device 110 with the appropriate PBX binding layer 170. The library of binding layers 180 may be resident on the gateway 130 (e.g., on a computer functioning as the gateway 130). In this case, the gateway 130 would know the PBX type information ahead of time. As shown in FIG. 2B, the entries 200 in the library 180 need only be for that particular PBX type, and the PBX type field 230 (seen in FIG. 2A) may be omitted. When the mobile device 110 connects with the gateway 130 it provides the gateway 130 with identity information specifying its device type (e.g., model X wireless phone, model Y PDA, or model Z notebook computer). The gateway 130 accesses the library 180 based on the mobile device type and selects the corresponding entry 200 and binding layer 210 to provide to the mobile device 110.

In another embodiment, the gateway 130 may access the library 180 over the network 120. The library 180 may be stored in another location on the network 120 or in another location accessible through, for example, an Internet connection. For instance, a PBX or mobile device manufacturer or some other entity may provide a library 180 accessible through a web site storing various binding layers 210. The gateway 130, may access the library 180 based on its knowledge of the PBX system type and the mobile device type to secure the appropriate binding layer 210 for providing to the mobile device 110.

In yet another embodiment, the mobile device 110 may store the library 180 and configure itself based on PBX type information provided by the gateway 130 about the PBX system 150. As seen in FIG. 2C, the mobile device type field 220 may be omitted, because the mobile device 110 need only store binding layers 210 for its particular device type. In this embodiment, the gateway 130 provides the mobile device 110 with the PBX type information when the mobile device 110 initiates a connection. Based on the PBX type information, the mobile device 110 accesses the PBX type field 230 to identify the appropriate binding layer 210 to use as its PBX binding layer 170.

The communication system 100 may have one or more libraries 180 installed, depending on the particular implementation. For example, if the mobile device 110 is unable to locate a proper binding layer 210 in its library 180, the gateway 130 may access its own internal library 180 and attempt to locate a proper binding layer 210. If the gateway 130 is still unable to locate a proper binding layer 210, it may access an external library 180 on the network 120 or accessible through the Internet to find the proper binding layer 210 for the particular mobile device 110. This multi-tier arrangement may be useful in a situation where new types or generations of mobile devices 110 are expected, and the library 180 is not expected to remain static.

Figure 3:
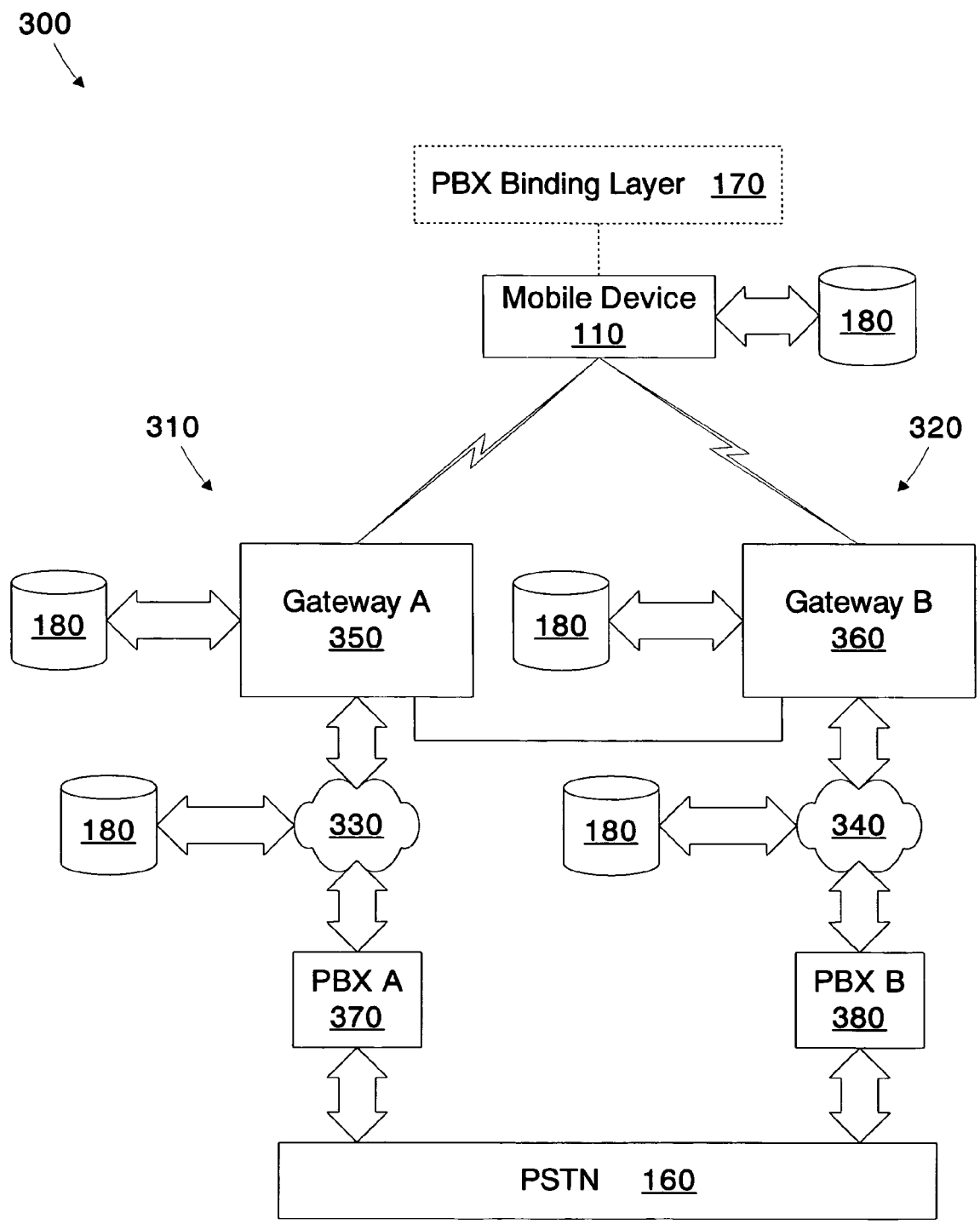
FIG. 3 is an alternative embodiment of a communication system that allows roaming between networks with different PBX types.

Turning now to FIG. 3, an alternative embodiment of a communication system 300 is provided. In the embodiment of FIG. 3, multiple systems 310, 320 on separate networks 330, 340 are provided. Each system 310, 320 has a respective gateway 350, 360 that interfaces with a respective PBX system 370, 380. Again, although a gateway 350, 360 is illustrated, access points (not shown may be provided for performing similar functions). In the illustrated embodiment, the PBX systems 370, 380 are of a different type (e.g., manufacturer or model number) and employ different internal protocols.

In the embodiment of FIG. 3, the wireless device 110 roams such that the gateway 350 passes responsibility for the mobile device 110 to the gateway 360. Those of ordinary skill in the art are familiar with such hand-off operations and the appropriate steps necessary to complete the transition. However, since the PBX systems 370, 380 are of different types, the mobile device 110 may need to reconfigure its PBX binding layer 170 during the transition. The mobile device 110 may become the hand-over agent in this case.

As the mobile device 110 comes into range of the system 320 from the range of the system 310, the gateway 360 initiates the hand-off procedure and informs the gateway 350 that it will be taking over responsibility for the mobile device 110. The gateway 360 and mobile device 110 then perform a configuration procedure similar to that described above in reference to FIG. 1. Either the gateway 360 or the mobile device 110 will identify a PBX binding layer 170 for the mobile device 110 based on the type of the mobile device 110 and the type of the PBX system 380. Then when the gateway 360 and the mobile device 110 are ready to complete the transition, the mobile device 110 can load the appropriate PBX binding layer 170 and operation may continue. Either the gateways 350, 360 may coordinate the hand-over, or alternatively, the mobile device 110 may coordinate the hand-over.

Figure 4:
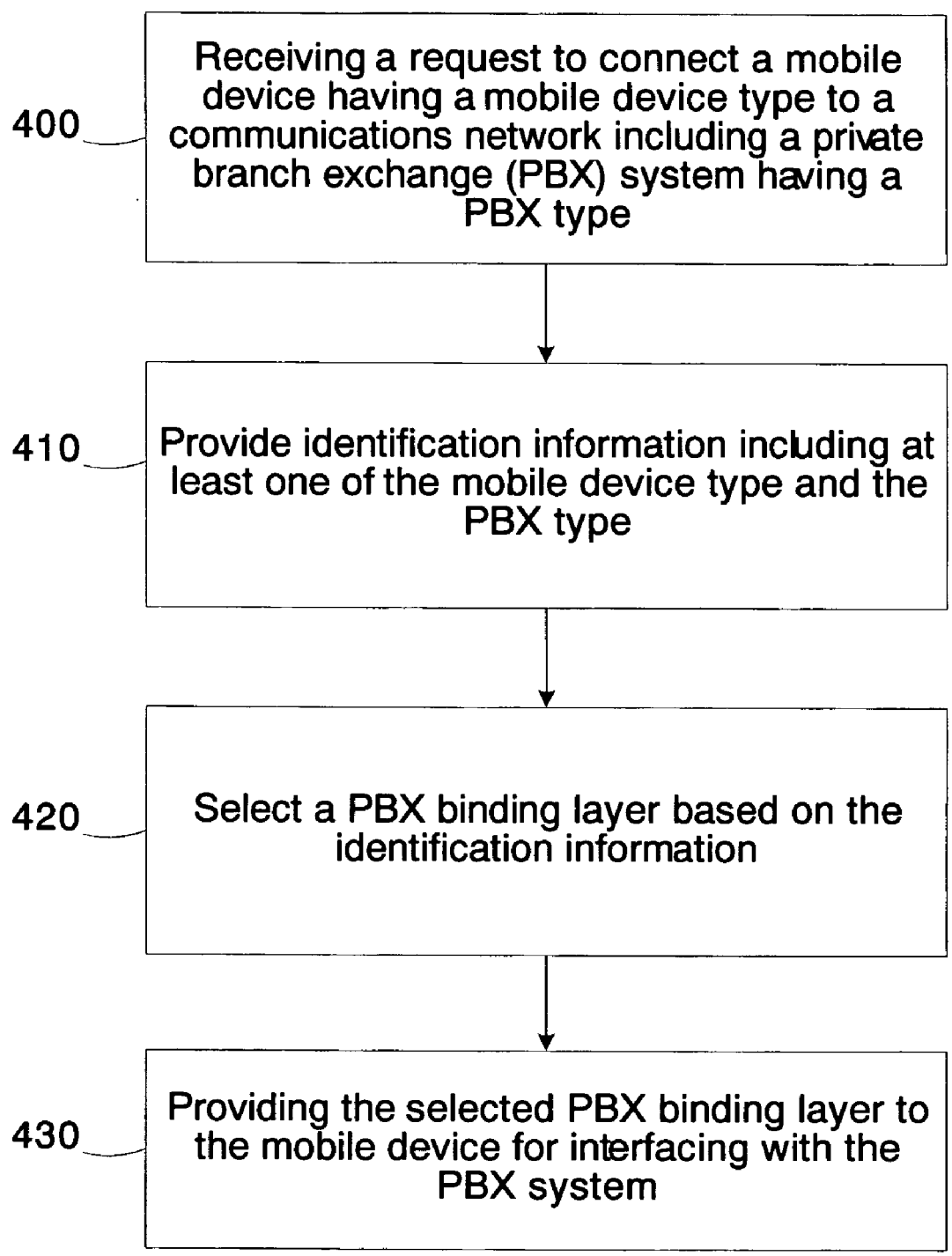
FIG. 4 is a simplified block diagram of a method for configuring a mobile device in accordance with another exemplary embodiment of the present invention.

Turning now to FIG. 4, a simplified block diagram of a method for configuring a mobile device 110 in accordance with another exemplary embodiment of the present invention is provided. In block 400, a request for connecting a mobile device 110 having a mobile device type to a communications network 100 including a private branch exchange (PBX) system 150 having a PBX type is received. In block 410, identification information including at least one of the mobile device type and the PBX type is provided. In block 420, a PBX binding layer 170 is selected based on the identification information. In block 430, the selected PBX binding layer 170 is provided to the mobile device 110 for interfacing with the PBX system 150.

Figure 5:
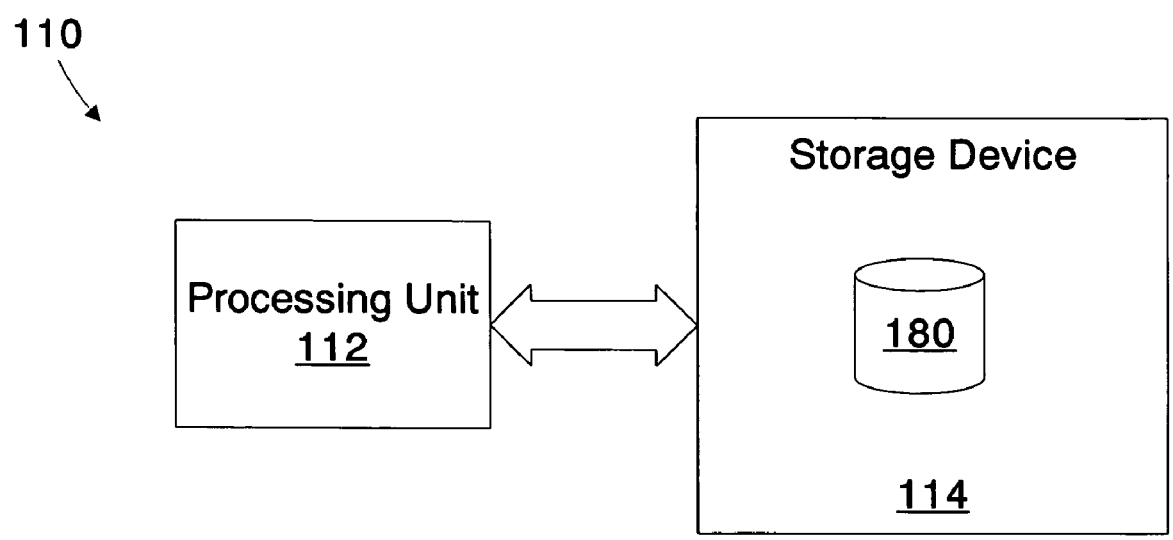
FIG. 5 is a simplified block diagram of the mobile device of FIG. 1 in accordance with yet another exemplary embodiment of the present invention.

Referring briefly to FIG. 5, a simplified block diagram of the mobile device 110 is provided. The mobile device 110 includes a processing unit 112 (e.g., a microprocessor and associated memory and bus circuitry) and a storage device 114 (e.g., a hard disk, floppy disk, programmable memory, CR-ROM disk, etc.) adapted to store the library of binding layers 180. In the embodiment, described above where the mobile device 110 houses the library of binding layers 180, the processing unit 112 is adapted to contact the gateway 130, receive the PBX type, and select the PBX binding layer 170 from the library of binding layers 180 based on at least the PBX type.

The automatic loading and updating of the PBX binding layer 170, as described herein, allows seamless connectivity through various VOIP and PBX systems. The user of the mobile device 110 is thus provided with a consistent user interface regardless of the underlying PBX system. If the user migrates to a different service point, the PBX binding layer 170 will be automatically updated, but the user will have substantially the same interface for interacting with the new system. The user interface may indicate that a transfer of networks has occurred, but the manner in which the user accesses the services on the new network should be essentially the same as the manner used for the previous network. The user profile and communication information is managed by the network, so an administrator may control the user profile from a centralized location. Also, the user ID and network address provided to the network during initialization will link to the user profile, thus allowing a user to use different devices and access the appropriate services.

The ease of system administration is increased, as the user's available services may be controlled based on the user profile regardless of the protocol used to connect to the PBX system. The PBX binding layer 170 may include instructions for enabling the services for which the user is authorized to use based on the profile. For example, the PBX binding layer 170 will only provide the instructions for accessing voice mail on the network 120 if the user is authorized to use the voice mail service. Also, current PBX binding layers may be stored in a centralized location on the network (i.e., in some embodiments) obviating the need to update distributed system versions and maintenance levels. A user's updated binding layer will be automatically loaded upon connection. In embodiments where the library of binding layers 180 is not stored on the mobile device 110, the storage space demands on the mobile device 110 are reduced.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:

receiving a request from a mobile device having a mobile device type to connect to a communications network including a private branch exchange (PBX) system having a PBX type at an interface agent;

providing identification information including at least one of the mobile device type and the PBX type responsive to the request, the identification information originating from at least one of the mobile device and the interface agent;

selecting a PBX binding layer based on the identification information; and providing the selected PBX binding layer to the mobile device for interfacing with the PBX system.

2. The method of claim 1, wherein providing the identification information further comprises providing both the mobile device type and the PBX type.

3. The method of claim 1, wherein selecting the PBX binding layer further comprises selecting the PBX binding layer from a library of PBX binding layers.

4. The method of claim 3, further comprising storing the library on the mobile device.

5. The method of claim 3, further comprising storing the library on an interface agent connected to the communications network.

6. The method of claim 3, further comprising accessing the library at a location remote from the communications network through a connection to the remote location.

7. The method of claim 1, further comprising accessing the PBX system through the mobile device using the selected PBX binding layer.

8. The method of claim 1, wherein the communication system further comprises a first communications network and the PBX system comprises a first PBX system having a first PBX type, and the method further comprises:

transferring the mobile device from the first communications network to a second communications network including a second private branch exchange (PBX) system having a second PBX type;

providing identification information including at least one of the mobile device type and the second PBX type;

selecting the PBX binding layer based on the identification information; and providing the selected PBX binding layer to the mobile device for interfacing with the second PBX system following a transfer from the first communications network to the second communications network.

9. The method of claim 8, wherein providing the identification information further comprises providing the mobile device type and the second PBX type.

10. The method of claim 8, wherein one of the first and second communications networks is a wireless communications network and the other of the first and second communications networks is a wired communications network.

11. The method of claim 8, further comprising providing a user interface for the mobile device, and wherein transferring the mobile device from the first communications network to the second communications network further comprises transferring the mobile device from the first communications network to the second communications network without substantially changing the user interface.

12. The method of claim 1, further comprising receiving a user profile, wherein the PBX binding layer includes instructions for configuring access to services on the communications network based on the user profile.

13. A system, comprising:

a first communications network, comprising:

an interface agent configured to receive a request from a mobile device having a mobile device type for connecting to the communications network; and a private branch exchange (PBX) system having a PBX type connected to the interface agent, wherein at least one of the mobile device and the interface agent is configured to provide identification information including at least one of the mobile device type and the PBX type responsive to the request;

select a PBX binding layer based on the identification information, provide the selected PBX binding layer to the mobile device for interfacing with the PBX system.

14. The system of claim 13, wherein the mobile device in configured to provide the mobile device type and the interface agent is configured to provide the PBX type.

15. The system of claim 13, further comprising a library of PBX binding layers in which the selected PBX binding layer is stored.

16. The system of claim 15, wherein the library resides on the mobile device.

17. The system of claim 15, wherein the library resides on the interface agent connected to the communications network.

18. The system of claim 15, wherein the library resides at a location remote from the communications network accessible by the communications network through a connection to the remote location.

19. The system of claim 13, wherein the mobile device is configured to connect to the interface agent over a wireless connection.

20. The system of claim 13, wherein the mobile device is configured to connect to the interface agent through a wired connection.

21. The system of claim 13, wherein the communications network further comprises a first communications network, the interface agent comprises a first interface agent, the PBX system comprises a first PBX system having a first PBX type, further comprising:

a second communications network, comprising:

a second interface agent connected to the second communications network and configured to take over communication with the mobile device from the first interface agent;

a second private branch exchange (PBX) system having a second PBX type, wherein at least one of the mobile device and the second interface agent is configured to provide identification information including at least one of the mobile device type and the second PBX type, select the PBX binding layer based on the identification information, and provide the selected PBX binding layer to the mobile device for interfacing with the second PBX system following a transfer of the mobile device from the first interface agent to the second interface agent.

22. The system of claim 19, wherein the mobile device is configured to provide the mobile device type and the second interface agent is adapted to provide the second PBX type.

23. The system of claim 21, wherein one of the first and second communications networks is a wireless communications network and the other of the first and second communications networks is a wired communications network.

24. The system of claim 21, wherein the mobile device includes a user interface, and wherein the user interface remains substantially following the transfer from the first interface agent to the second interface agent.

25. The system of claim 13, wherein the PBX binding layer includes instructions for configuring access to services on the communications network based on a user profile associated with the mobile device.

26. The system of claim 13, wherein the interface agent further comprises at least one of a gateway, and access point a wireless switch, a wired switch, and a server.

27. A system, comprising:
a mobile device having a mobile device type;
a communications network including:
   an interface agent at which the mobile device is connected to the communications network; and
   a private branch exchange (PBX) system connected to the interface agent, the PBX system having a PBX type; and
a library of PBX binding layers indexed by at least one of the mobile device type and the PBX type for selection and download to the mobile device by at least one of the mobile device and the interface agent for configuring the mobile device to interface with the PBX system responsive to a request from the mobile device to connect to the PBX system.

28. The system of claim 13, wherein the interface agent further comprises at least one of a gateway, and access point, a wireless switch, a wind switch, and a server.

29. A system, comprising:
means for receiving a request from a mobile device having a mobile device type to connect to a communications network including a private branch exchange (PBX) system having a PBX type;
means for providing identification information including at least one of the mobile device type and the PBX type responsive to the request;
means for selecting a PBX binding layer based on the identification information; and
means for configuring the mobile device to interface with the PBX system using the selected PBX binding layer.

* * * * *

UNITED STATES PATENT AND TRADEMARK OFFICE
CERTIFICATE OF CORRECTION

| | |
|---|---|
| PATENT NO. | : 7,272,414 B2 |
| APPLICATION NO. | : 10/741971 |
| DATED | : September 18, 2007 |
| INVENTOR(S) | : Luis F. Llamas et al. |

It is certified that error appears in the above-identified patent and that said Letters Patent is hereby corrected as shown below:

In claim 14, column 10, line 15, change the word "in" to the word -- is --.

In claim 22, column 10, line 57, change claim "19" to claim -- 21 --.

Signed and Sealed this

Eleventh Day of December, 2007

JON W. DUDAS
*Director of the United States Patent and Trademark Office*

UNITED STATES PATENT AND TRADEMARK OFFICE
CERTIFICATE OF CORRECTION

PATENT NO. : 7,272,414 B2 Page 1 of 1
APPLICATION NO. : 10/741971
DATED : September 18, 2007
INVENTOR(S) : Luis F. Ilamas et al.

It is certified that error appears in the above-identified patent and that said Letters Patent is hereby corrected as shown below:

In claim 14, column 10, line 15, change the word "in" to the word --is--.

In claim 22, column 10, line 57, change claim "19" to claim --21--.

Signed and Sealed this

Twenty-fifth Day of December, 2007

JON W. DUDAS
*Director of the United States Patent and Trademark Office*